Figure 1:
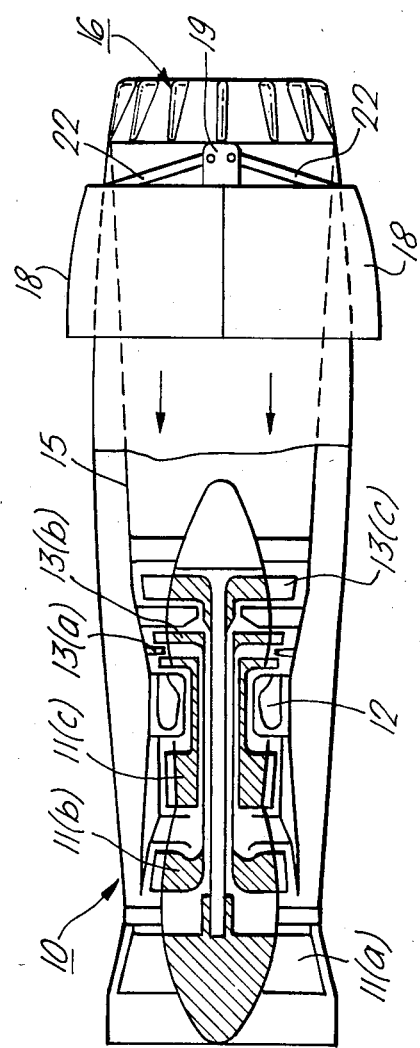

United States Patent [19]

Tape

[11] Patent Number: 4,805,840
[45] Date of Patent: Feb. 21, 1989

[54] THRUST DEFLECTORS FOR PROPULSION NOZZLES OF TURBOMACHINES

[75] Inventor: Robert F. Tape, Marietta, Ga.

[73] Assignee: Rolls-Royce, Inc., New York, N.Y.

[21] Appl. No.: 851,931

[22] Filed: Apr. 14, 1986

[51] Int. Cl.4 ............................................. F02K 1/12
[52] U.S. Cl. ..................... 239/265.35; 60/230; 239/265.37
[58] Field of Search ............. 239/265.19, 265.29, 239/265.35, 265.37, 265.33, 265.25, 265.27, 265.39; 60/228, 230; 244/3.21, 3.22, 52, 110 B

[56] References Cited

U.S. PATENT DOCUMENTS

| | | | |
|---|---|---|---|
| 3,401,886 | 9/1968 | Osborn | 239/265.25 |
| 3,776,467 | 12/1973 | Riemerschmid | 239/265.35 |
| 3,837,578 | 9/1974 | Leibach | 239/265.35 |

FOREIGN PATENT DOCUMENTS

| | | | |
|---|---|---|---|
| 789410 | 1/1958 | United Kingdom | 239/265.33 |
| 1327385 | 8/1973 | United Kingdom | 239/265.19 |

Primary Examiner—Andres Kashnikow
Attorney, Agent, or Firm—Cushman, Darby & Cushman

[57] ABSTRACT

A nozzle 16 for a turbojet is provided with a thrust deflector mechanism, downstream of the nozzle in the form of one or more target-type thrust reverser plates 18. The plate or plates 18 are movable from a stowed position into the efflux of gases issuing from the nozzle to deflect the exhaust gases and hence redirect the thrust produced by the nozzle obliquely relative to the central axis of the nozzle 16. The plate or plates 18 are mounted in a bearing for rotation about the longitudinal axis of the jet pipe. When rotated the redirected thrust is effectively rotated relative to the central axis of the nozzle. In one embodiment a pair of plates 18 is used and they can also be employed as a conventional thrust reverser.

4 Claims, 2 Drawing Sheets

THRUST DEFLECTORS FOR PROPULSION NOZZLES OF TURBOMACHINES

This invention relates to propulsion nozzles for gas turbine aeroengines, and in particular to thrust deflectors for such nozzles which enable the direction of thrust produced by the nozzle to be varied.

Vectorable thrust nozzles, as these nozzles are called, are many and varied. One form of such a nozzle can be vectored from a position where the nozzle discharges rearwards to produce forward thrust, through 90° to a vertical position where the nozzle is directed downwards to produce vertical lift for vertical take off (VTO). An example of this type of nozzle is to be found on the Rolls-Royce Pegasus engine which powers the British Aerospace Harrier aircraft.

A second form of nozzle is vectorable over a much more limited range, (typically plus or minus about 20° from the horizontal position), to assist in altitude control (pitching of the nose of the aircraft in up and down directions). In some designs of aircraft, the propulsion nozzles supplement the primary flight controls effected by elevators or elevrons.

There is a need for a much more versatile flight control in which the propulsive thrust can be vectored not only upwards and downwards but also in port and starboard directions to supplement, or replace flight directional control (yawing) normally accomplished using rudders.

An object of the present invention is to provide a propulsion nozzle for a gas turbine engine with a thrust deflector means in which the thrust produced by the nozzle can be defected conically relative to a central axis of the nozzle.

The invention as claimed achieves this object by the provision of the deflector plates, which may selectively be operated, singularly or in unison, to move at least one of the plates to a position where it deflects the exhaust gases. The plates are rotatably mounted on the jet pipe so that the deflected thrust can effectively be rotated about the central axis of the nozzle.

Figure 2:
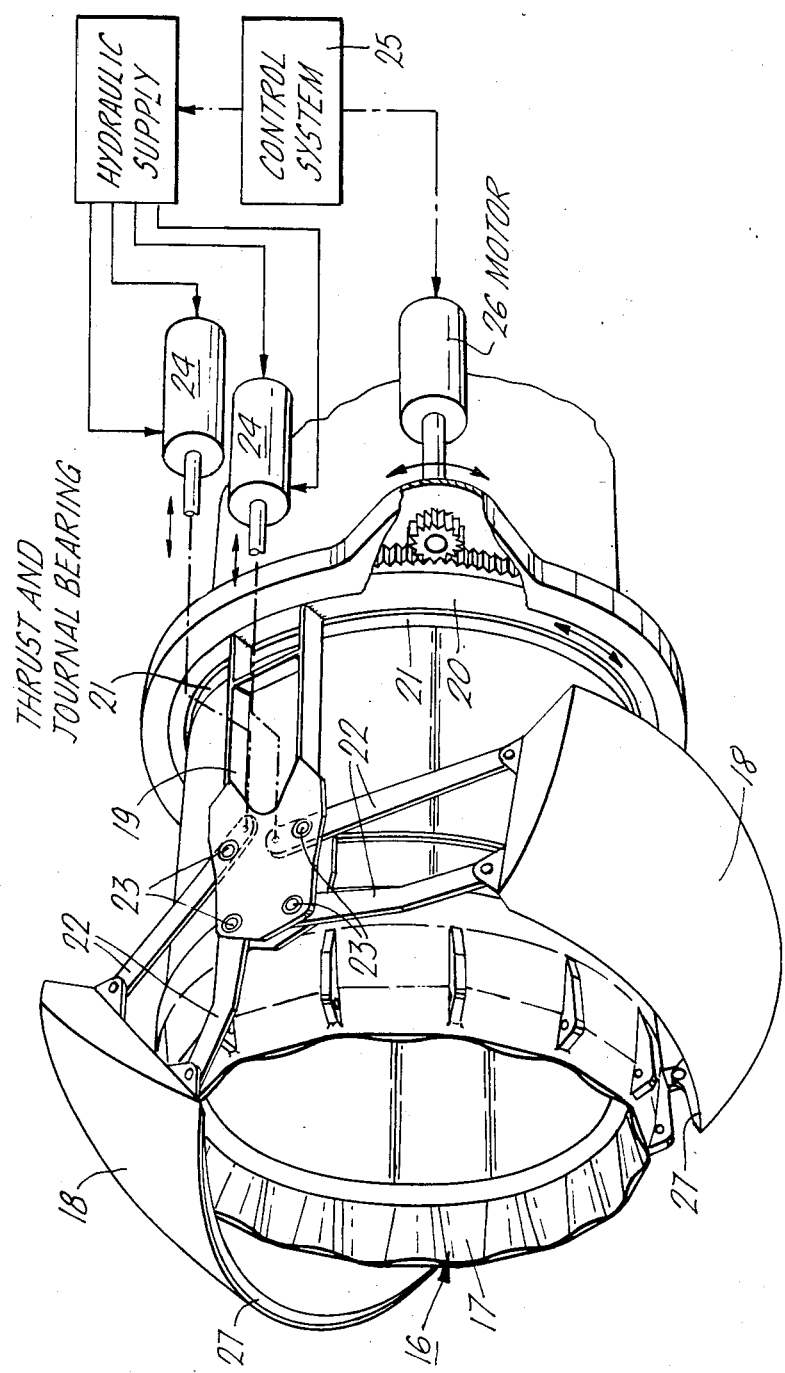

An embodiment of the present invention will now be described, by way of an example, with reference to the accompanying drawings in which:

FIG. 1 shows schematically a cross sectional view of a gas turbine engine having a propulsion nozzle incorporating a thrust deflector constructed in accordance with the present invention, and FIG. 2 illustrates in greater detail the nozzle and thrust deflector of FIG. 1.

Referring to FIG. 1, the gas turbine engine 10 comprises, in flow series, three axial flow compressors 11a, 11b, 11c, a combustion chamber 12, three turbines 13, 13b, 13c which drive respectively the third, second and the first compressors 11c, 11b, 11a and a jet pipe 15, which is provided with a nozzle 16 incorporating thrust deflectors 18 and constructed in accordance with the present invention.

Referring to FIG. 2 the nozzle 16 comprises an axis-symmetric array of petals 17 which define the exit area of the jet pipe. The actual design of the nozzle is not fundamental to the present invention, and in fact it need not be a variable area nozzle. It could simply be a fixed area nozzle.

Nevertheless, in this specific embodiment of the invention t is a variable area nozzle and it is of similar construction to that described in British Pat. No. 1278801 (U.S. Pat. No. 3,643,868).

Located adjacent to the nozzle 16 are a pair of target-type thrust reverser plates 18. The thrust reverser plates 18 are mounted on a pair of arms 19 carried by a ring 20 which is itself rotatably mounted on the jet pipe 15 in a bearing 21. Each plate 18 is mounted on a pair of links 22 each side which are pivotally mounted on pivots 23 on the arms 19. One end of the links 22 is pivotally attached to the plates 18 and the other end of at least one of each pair of links 22 on each side of each plate is pivotally attached to an actuator, shown schematically by the hydraulic rams 24, and control system 25.

Each plate 18 can be operated independently of the other to move it from a stowed position (the position of the lower plate shown in FIG. 2) to a position where it is in the flow path of the exhaust gases of the nozzle 16 (the position of the upper plate shown in FIG. 2). In this latter position, the deployed plate deflects the exhaust gases to produce a thrust on the aircraft in which the engine is installed, which is directed at an angle to the central axis of the nozzle 16. Since the deflector plates are deployed downstream of the nozzle 16 the plates are designed and spaced a sufficient distance from the nozzle 16 when they are deployed, so that they do not restrict the flow of gases through the nozzle 16. In this way the thrust from the nozzle 16 can be optimised for all flight conditions irrespective of whether the plates 18 are deployed or stowed.

With one of the plates 18 deployed the direction of the deflected thrust can effectively be rotated "conically" by rotating the plates 18 in the bearing by operating the motor 26 which engages either a chain drive or a direct gear drive to the ring 20.

The plates 18 can be operated in unison by synchronising the operation of hydraulic rams 24 and can be moved to a fully deployed thrust reverse position, where the downstream edges 27 of the plates 18 abutt and all the exhaust gases are redirected with a forwards component to reverse the direction of thrust.

It is to be understood that either or both plates 18 may be deployable to the "partially deflected" position (upper plate of FIG. 2).

It is envisaged that the deflector plates 18 would be operated individually, and the plates 18 would only rotate in bearing 21 for a maximum of 180° in either direction, to change thrust direction from the vertical plane to the horizontal plane. In this arrangement, the plate 18 would be used for deflecting the gases to produce thrust in a starboard direction and the other for producing thrust in a port direction.

In an alternative arrangement, only one of the plates 18 is used to deflect the thrust and the other stowed, except for the purpose of reversing the thrust, when both plates are deployed. In this latter arrangement the single deployed plate 18 could be reciprocated in either direction through 180° to achieve the change of direction of thrust or alternatively it could be rotated in a single direction.

It is to be understood that although the doors 18 can be operated individually, the control mechanism 24, 25 to effect deployment of the doors must be integrated so that the individual movements of one door can be correlated to the movements of the other door in order to achieve the desired direction of deflection of the thrust.

It is understood that although the above described embodiment of the invention employs a pair of plates 18 which can be used as a thrust reverser, if thrust reversing is not required then the plates may be made much smaller and designed so that they do not abutt when deployed.

In this case the doors would be deployed singularly and would be positioned and constructed to deflect the thrust obliquely or normal to the flow of gases issuing from the nozzle 16.

Furthermore, if an even lighter structure is required without the ability of reversing thrust then one of the plates 18 of FIG. 3 and one of the pairs of hydraulic jacks 25 could be omitted. In this case the single plate would be constructed so as to be movable to and from the stowed position and the deployed position. Such a single plate would be rotatable bodily about the central axis of the nozzle 16 in exactly the same way as each door 18 of FIG. 2.

I claim:

1. A thrust deflector means for a propulsion nozzle of a turbojet aero-engine, said nozzle having a central axis, comprising at least two thrust deflector plates, a common ring means mounting both of said plates for rotation together about the axis of the nozzle, each of said deflector plates having separate actuator means with each actuator means being operable to move a said respective plate from a first position where said plate is stowed out of the flow path of gases from the nozzle, which in use flow through the nozzle, to and from a second position where said respective plate is deployed in the flow path for the purpose of deflecting the gases and thereby redirect the thrust produced by the nozzle in a direction angled to the flow of gases which, in use, issue from the nozzle, and rotation means for effecting rotation of said ring means to vary the direction of the redirected thrust relative to the axis of the nozzle.

2. A thrust deflector means according to claim wherein each actuator means includes means operable to move both of said plates in unison to a deployed position where they are positioned in the flow path and about each other thereby to deflect the gases and redirect the thrust with a component of direction opposite to the direction of flow through the nozzle.

3. A thrust deflector means according to claim 1 wherein the nozzle is a variable area nozzle.

4. A thrust deflector means according to claim 1 wherein the nozzle is a fixed area nozzle.

* * * * *